United States Patent

Grady, deceased

[15] 3,645,708
[45] *Feb. 29, 1972

[54] STEEL SLAG HANDLING SYSTEM AND METHOD FOR USING

[72] Inventor: John J. Grady, deceased, late of New Florence, Pa. by Betty Jane Grady, executrix

[73] Assignee: International Steel Slag Corporation, Washington, D.C.

[ * ] Notice: The portion of the term of this patent subsequent to Apr. 25, 1984, has been disclaimed.

[22] Filed: Dec. 4, 1969

[21] Appl. No.: 882,317

Related U.S. Application Data

[63] Continuation of Ser. No. 632,704, Apr. 21, 1967, abandoned, and a continuation-in-part of Ser. No. 632,822, Apr. 21, 1967, Pat. No. 3,523,015, and Ser. No. 632,704, and Ser. No. 632,822, Continuation-in-part of Ser. No. 428,519, Jan. 27, 1965, Pat. No. 3,316,075, and a continuation-in-part of 535,143, Mar. 17, 1966, abandoned, and Ser. No. 428,519, , and Ser. No. 535,143, , Continuation-in-part of Ser. No. 126,792, June 21, 1961, abandoned.

[52] U.S. Cl. .................................65/19, 65/20, 65/141, 75/24
[51] Int. Cl. .................................C03b 5/18
[58] Field of Search .................65/19, 20, 141; 75/24

[56] References Cited
UNITED STATES PATENTS 3,316,075  4/1967  Grady........................65/19
3,523,015  8/1970  Grady........................65/19

Primary Examiner—Arthur D. Kellogg
Assistant Examiner—Robert L. Lindsay
Attorney—LeBlanc & Shur

[57] ABSTRACT

A system is described for improved processing and disposal of molten steel slag formed during steel furnace operation. The system comprises steel slag granulator apparatus of the type described in detail in copending U.S. Pat. application Ser. No. 428,519 and associated equipment including controllable molten slag feeding apparatus, aspirator-pump means for collecting the steam generated during the slag granulation process, and for transferring it to a suitable disposal point, an improved water nozzle arrangement to produce a U-shaped or H-shaped jetstream of water for slag granulation, and a hydraulic transport apparatus for conveying the granulated and cooled steel slag away from the granulator in the form of a water-slag slurry. The system also includes slag dewatering apparatus to extract the granulated slag particles from the slurry to permit storage or disposal in relatively dry form, and high-efficiency filtering means to permit direct disposal of the granulating water in nearby rivers or sewers without danger of contamination due to high solids concentration in the discharged water. One embodiment includes means for stockpiling the dried slag directly on the ground, while a second embodiment includes means for classifying the slag particles by size prior to storage.

27 Claims, 8 Drawing Figures

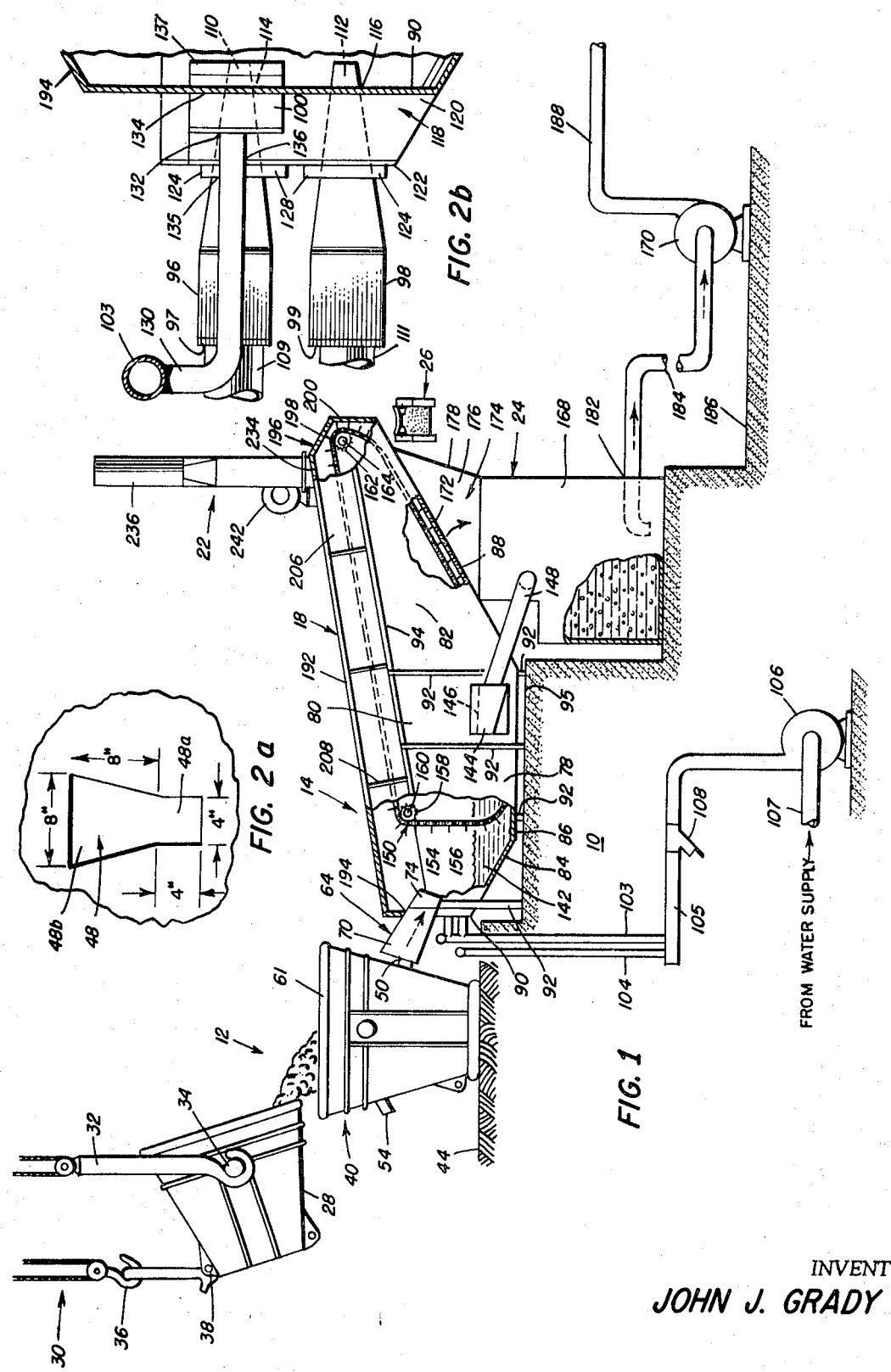

INVENTOR
JOHN J. GRADY

Le Blanc & Shur
ATTORNEYS

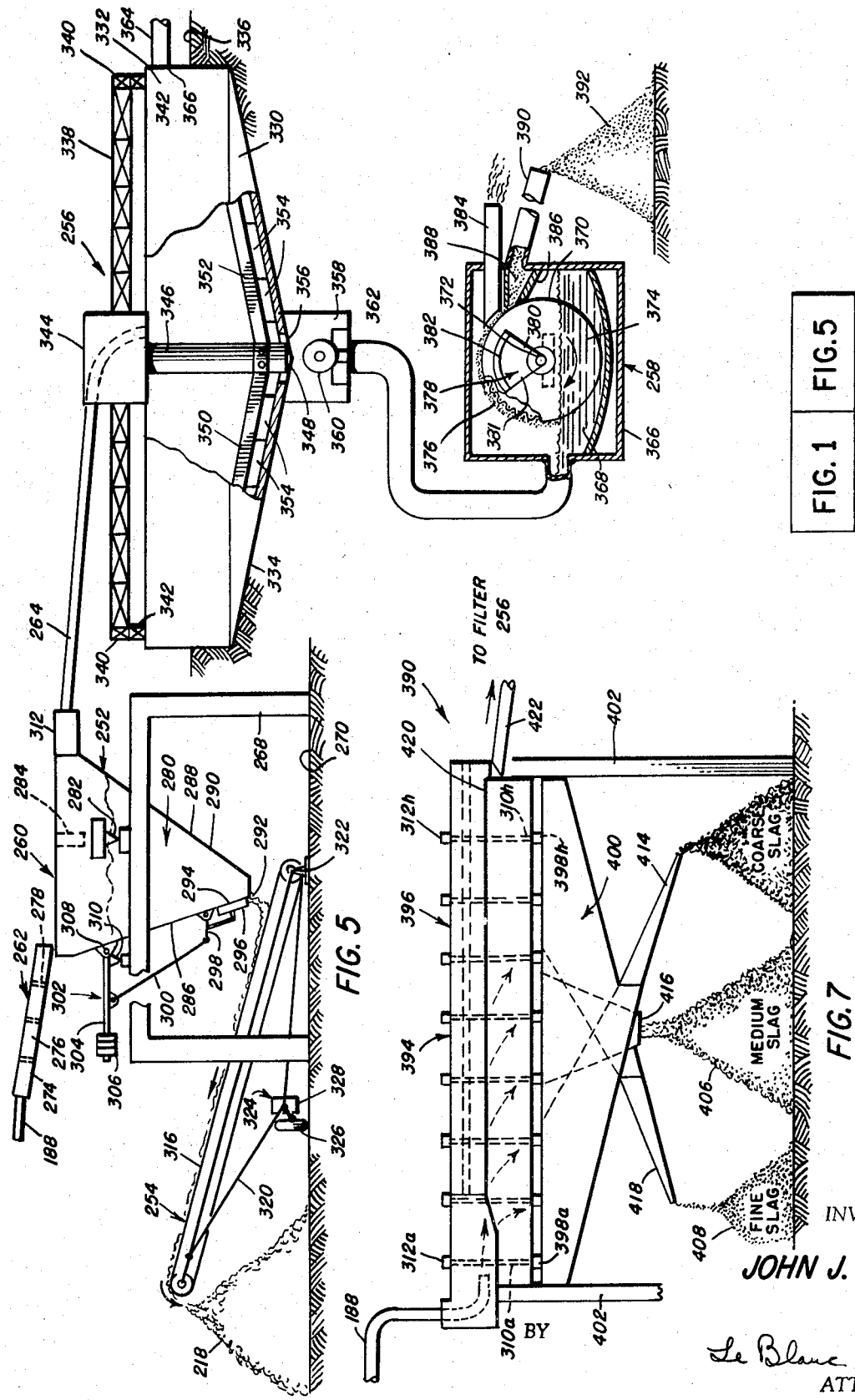

STEEL SLAG HANDLING SYSTEM AND METHOD FOR USING

INTRODUCTION

This application is a continuation of copending application, Ser. No. 632,704, filed Apr. 21, 1967 now abandoned entitled STEEL SLAG HANDLING SYSTEM, the latter being, in turn, a continuation-in-part of copending application Ser. No. 428,519, filed Jan. 27, 1965, entitled STEEL SLAG HANDLING SYSTEM, now U.S. Pat. No. 3,316,075 and of copending application Ser. No. 535,143, entitled STEEL SLAG HANDLING SYSTEM, filed Mar. 17, 1966, now abandoned each of which is a continuation-in-part of earlier application Ser. No. 126,792, filed June 21, 1961 and now abandoned. This application is also a continuation-in-part of copending application Ser. No. 632,822, filed Apr. 21, 1967, now U.S. Pat. No. 3,523,015 and entitled STEEL SLAG HANDLING SYSTEM, the latter also being in turn, a continuation-in-part of copending applications Ser. No. 428,519 and Ser. No. 535,143 now abandoned.

Reference is also made to my copending U.S. Pat. application Ser. No. 629,755, filed Apr. 10, 1967, now U.S. Pat. No. 3,531,270 and to application No. 632,825, filed Apr. 21, 1967, now U.S. Pat. No. 3,531,269 both of which applications are directed to various portions of the system described herein. Insofar as pertinent, all of the above-identified U.S. patent applications are to be considered as incorporated by reference in the present application.

THE INVENTION

The present invention relates to an improved system for processing and disposal of molten slag discharged from a steelmaking furnace. More particularly, this invention relates to an "open system" method and apparatus for granulating and cooling molten steel slag by interaction with one or more jets of water under certain specified conditions, then removing the granulated slag from the granulator as a slag-water slurry and subsequently removing the water to convert the slag to a substantially dry granular form. This invention is particularly adapted for use in an area where large quantities of relatively cool water are conveniently available and thus includes facilities for effective water filtration to permit disposal of the granulating and cooling water by direct discharge into nearby rivers.

As discussed in considerable detail in the aforementioned parent applications Ser. Nos. 428,519 and 126,792, and related applications, the efficient, quick removal of large quantities of molten slag from open hearth and other steelmaking furnaces and the processing thereof is a long standing major problem in the manufacture of steel. A tremendous amount of slag must be removed from the furnace each day and efficiently processed without interruption of furnace operation if maximum steelmaking capacity is to be realized.

The problems of handling and removing steel slag have been seriously increased by the U.S. steel industry's rapid adoption within the past several years, of oxygen steelmaking furnaces, sometimes referred to as "OSM" of "BOF" furnaces. These furnaces are capable of producing steel in even larger quantities in shorter periods of time than many of the most up-to-date open hearth installations. For example, one steel company in the United States has produced about 240 tons of steel in 27 minutes, tap-to-tap, compared to 6-8 hours in modern open hearth furnaces. Such oxygen steelmaking furnaces form large quantities of slag, e.g., on the order of 12-16 percent of the heat tonnage. Thus, an OSM or BOF furnace producing about 200-250 tons of steel in 30-60 min. will also produce as much as 35 tons of molten slag in 30-60 minutes. Such large quantities of molten slag must be rapidly removed and disposed of, without interruption or delay in the operation of the furnace.

As further described in detail in parent application Ser. No. 428,519, the steel making industry has employed numerous systems for slag processing and disposal. One such technique involves discharging the molten slag into slag pots which are transported by means of cranes and/or rail cars from the furnace to a relatively remote disposal location. Further processing of the slag for metal recovery or road building, etc., requires that the solidified slag be broken up from relatively large pieces with extra equipment at substantial cost.

As amplified in the aforementioned parent application such multistep batch methods of handling molten slag are not only costly from the viewpoint of slag handling, but also have serious inherent shortcomings whereby improvement on such methods is essential to minimize or avoid production delays, and is a matter of serious concern to the entire steelmaking industry.

The invention described in parent application Ser. No. 428,519, is a steel slag granulating system including method and apparatus which permits substantially continuous processing and removal of steel slag discharged from the furnace without delay in the steel making process. In particular, the steel slag granulating system of my parent cases comprises a receptacle into which the red-hot molten slag from the steel furnace is discharged and in which it is suddenly cooled and granulated by jets of water injected into the granulator to intercept the stream of molten slag. The result is the formation of relatively small, discrete particles of granulated slag which may then be discharged from the granulator and transported by continuous mechanical or hydraulic conveyor means to a suitable storage or disposal facility.

The subject matter of the present application is an open hydraulic steel slag granulating and processing system incorporating the granulator described above. In the present system, granulation and cooling of the molten steel slag in the above-described manner is followed by the convenient transportation of the slag from the granulator in the form of a water-slag slurry and the subsequent separation of the water and the granulated slag. The dried slag may then be stored, e.g., in bins or in the open pits or directly on the ground, prior to further processing, use or other disposal.

As amplified below, proper operation of the basic granulating system requires the availability of substantial quantities of relatively cool water, both to minimize evolution of steam and also to achieve effective and safe steel slag granulation. Accordingly, after the granulated slag particles have been extracted from the slag-water slurry, it may be necessary to dispose of extremely large quantities of spent water. In copending application Ser. No. 632,822 filed Apr. 21, 1967, there is disclosed a closed hydraulic system in which the problems of disposal of such water are obviated by the employment of a water recirculation system in which the water is continually reused in the operation of the granulator system. The closed hydraulic arrangement is especially attractive, not only due to the elimination of water disposal problems, but also since it reduces considerably the amount of water necessary for satisfactory granulator operation.

On the other hand, the closed hydraulic system is somewhat complex and requires efficient means for substantially cooling the previously used water before reuse. Where it is possible to filter the used water in an effective and economical manner, e.g., to comply with local ordinances pertaining to the disposal of industrially used water, and where relatively large quantities of water are freely available for use in the granulator system, an alternative to the above-mentioned closed hydraulic granulator system is quite desirable. An open hydraulic system, in which the water is efficiently separated from the granulated slag and properly filtered to permit disposal in nearby sewers or rivers, is the subject of the present invention.

Accordingly, it is a general object of the present invention to provide a further improvement of the steel slag granulating system described in parent application Ser. No. 428,519.

It is a more specific object of this invention to provide an improved steel slag granulating system in which molten steel slag transported from the steel making furnace is discharged into a granulator system to form a slag-water slurry from which a substantial portion of water is subsequently removed, whereby the granulated slag may be stored or disposed of in substantially dry form.

It is a related object of this invention to provide a granulator system as described above in which the water extracted from the slag-water slurry is processed to render it sufficiently clean so that it may be disposed in nearby sewers or rivers without additional treatment.

The exact nature of this invention as well as other objects and advantages thereof, will become apparent from consideration of the following detailed description and the accompanying drawing in which:

FIG. 1 is a schematic side elevation, partially cutaway to reveal the essential features of the molten slag feeding, cooling and granulation, and hydraulic transport portions of the slag handling system of this invention;

FIG. 2a is an enlarged, fragmentary view of a portion of FIG. 1 showing the construction of the pouring opening and the slag feeding vessel;

FIG. 2b is an enlarged view of a further portion of FIG. 1 illustrating the construction and assembly of the water jet nozzles;

FIG. 5 is a generally schematic view of the slag drying and water filtration portions of the system in which the dewatered slag is directly stockpiled in relatively dry form;

Figure 3:
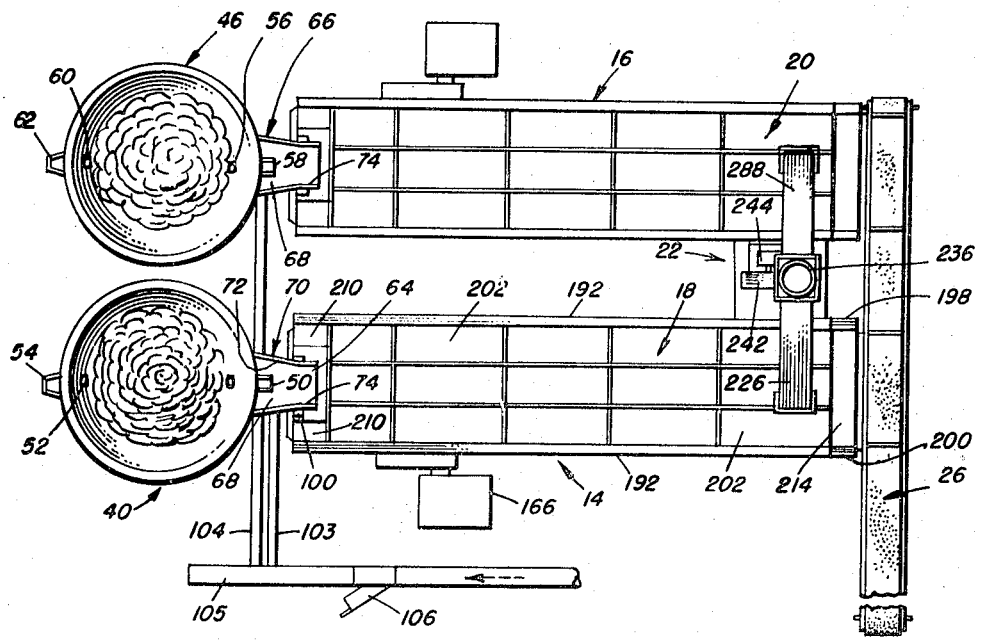
FIG. 3 is a top plan view of the portion of the system shown in FIG. 1.

FIG. 6 shows the manner in which FIGS. 1 and 5 are to be arranged to form an overall schematic view of the system of the present invention; and FIG. 7 is a generalized schematic view of one suitable modification of the drying and water filtration portions of the system which may be substituted for the arrangement shown in FIG. 5, and which provides size classification of the granulated slag prior to stockpiling.

Referring now to the drawings, and in particular to FIGS. 1-4, the granulating portion of the present invention denoted generally by reference numeral 10, includes molten slag feeding apparatus 12, and granulating apparatus including a pair of similar granulators 14 and 16, disposed adjacent to each other at some convenient location close to the steelmaking furnaces. Granulators 14 and 16 are fitted with steam hoods 18 and 20, respectively, for reducing uncontrolled emission of steam generated by contact between the red-hot slag and the cooling and granulating water. Common steam collection and disposal means, generally denoted as 22, cooperates with steam hoods 18 and 20 to collect steam produced during granulation and to transport it to a remote point for venting to the atmosphere. As described hereinafter, the granulated slag resulting from operation of granulators 14 and 16 is preferably collected and removed from the granulator by means of hydraulic transport apparatus generally denoted as 24. Screening means and an oversized particle conveyor 26 are provided to facilitate convenient handling of large slag particles or other debris which might damage the hydraulic transport apparatus or which, in any event, could not be efficiently transported in the slag-water slurry.

The construction of slag feeding apparatus 12 is illustrated in FIGS. 1, 2a, and 3. The arrangement shown is especially useful when location of granulator system 10 in extremely close proximity to the steel making furnaces is not feasible, e.g., due to space limitations. Here, molten slag is transported from the steel furnace by means of a refractory lined slag ladle or container 28. This is carried by a remotely controlled overhead crane 30 including a pair of spaced lifting hooks such as 32, adapted to engage a pair of trunnions 34 on opposite sides of ladle 28. Crane 30 is also fitted with a separate pouring hook 36 adapted to engage with a lifting bar 38 secured to the bottom of ladle 28 for controllably tilting the ladle on trunnions 34 to discharge the molten slag. Crane 30 is adapted to travel on an overhead track (not shown) into and out of the plane of FIG. 1 and transversely of granulator system 10 in FIG. 3 to permit alignment with either of granulators 14 or 16.

An auxiliary vessel 40 supported on a pedestal 42 on the floor 44 of the steel making shop (or in the surrounding yards) and a similar vessel 46 (see FIG. 3) serve as tundishes for feeding molten slag to granulators 14 and 16, respectively, with a controlled rate of flow. The contents of slag ladle 28 may be discharged into either of vessels 40 or 46 by positioning overhead crane 30 at the proper location along its track. This permits backup use of either of granulators 14 and 16, should the other granulator be disabled. The arrangement also permits two different tundish setups for two rates of pour of molten slag from crane ladle 28 via the tundish into the respective granulators, if desired, for slag having different characteristics as occurs for different-type steel heats.

As illustrated herein, tundish vessels 40 and 46 comprise suitably modified steel slag ladles or blast furnace slag pots, although it will be appreciated that specifically designed tundish receptacles may be employed. Tundish vessel 40 includes a slag feeding aperture 48 (see FIG. 2a) cut into the vessel wall at a predetermined level with a pouring spout 50 secured around the opening by welding or in any other convenient fashion.

An overflow opening 52 is also cut into the wall of tundish 40, e.g., diametrically opposite to slag feeding opening 48, and is fitted with an appropriate spout 54. Opening 52 is disposed at a predetermined height above opening 48 and permits overflow to the ground or shop floor 44 if the level of molten slag in the vessel exceeds that of opening 52.

Hence, if the rate of slag flow into vessel 40 from ladle 28 exceeds the rate of discharge through aperture 48, the level of the liquid slag will ultimately exceed the level of opening 52. At that time, molten slag will be discharged to pit 44, thus establishing a maximum slag flow rate from tundish 40 through aperture 48 into the granulator 14, i.e., a maximum pressure head of molten slag is maintained in tundish 40, thereby controlling the rate at which molten slag enters the granulator system. Further, discharge of slag to pit 44 through upper aperture 52 alerts the crane operator to reduce the slag input rate, by lowering pouring hook 36.

With reference to FIG. 3, the second tundish 46 is of substantially identical construction as tundish vessel 40, and includes a granulator feeding aperture 56, an upper slag overflow opening 60, and a pair of associated spouts 58 and 62, respectively. The relationship between openings 56 and 60 is preferably the same as that between openings 48 and 52 in vessel 40 to assure like operation of both portions of the system. Satisfactory operation may be achieved for openings 48 and 56 having configuration and dimensions as shown in FIG. 2a. Openings 52 and 60 are preferably both in the form of a square about 4 inches on a side. Under such conditions, satisfactory operation may be achieved with the bottom of openings 52 and 60 vertically spaced approximately 2–4 inches above the tops of openings 48 and 56.

The configuration of openings 48 and 56 illustrated in FIG. 2a is preferred because the lower square section 48a establishes the desired rate of slag flow having a head equivalent to the height of section 48a. The flaring upper section 48b provides a linearly increasing aperture area per unit of height from the bottom to the top of section 48b due to the increasing transverse dimension. The increasing area causes the velocity of the molten slag leaving tundish 40 to decrease from the bottom to the top of section 48b so that the molten slag will not have too long a trajectory in relation to the dimensions of granulator 14 and chute 64.

In this regard, it should be appreciated that the 4 inch head specified between openings 48 and 52 may be achieved by location of opening 48 at the required distance below the lip 61 at the top of vessel 40. In that case, a small notch is preferably provided at the back of the vessel to limit overflow to the region of the ground or pit 44 behind the vessel.

The above-described slag feeding apparatus 12 is exemplary of a preferred embodiment but several alternative approaches could be used in light of the disclosure herein. For example, the granulator slag feeding arrangement could incorporate a movable slag runner which can be displaced from association with a slag ladle or like means used for transferring the slag directly from the steel furnace to the granulator utilizing slag runners or chutes analogous to those disclosed in my parent application Ser. No. 428,519, or in copending application Ser. No. 551,168, filed May 18, 1966, and entitled "Steel Slag Handling System," now U.S. Pat. No. 3,316,079.

Referring to FIGS. 1 and 3, the slag feeding arrangement employed should preferably terminate in a refractory lined steel discharge chute 64 associated with granulator 14, and a like discharge chute 66 associated with granulator 16. Chutes 64 and 66 are supported by any convenient support means (omitted from the drawings to show the other parts more clearly) and project into granulator receptacles 14 and 16 through suitable openings in the end walls.

As amplified below, it is preferable that the streams of molten slag flowing into the granulators possess minimum velocity components transverse to the primary flow direction, i.e., longitudinally of the chutes. Accordingly, discharge chutes 64 and 66 are formed in any convenient manner with sloping bottom portions 68 and vertical side portions 70. When side portions 70 include inwardly tapered segments such as 72, e.g., to accommodate placement of tundish spouts 50 or 58. The chute should include terminal straight-sided portions 74, preferably at least about 1 foot in length to minimize the trajectory of the molten slag transverse to the overall flow direction. Chutes 64 and 66 lie at a suitable angle relative to the horizontal so that the flow of slag into the granulators is gravity assisted. The angle may be substantially as illustrated in FIG. 1, but can be varied according to varying viscosity of particular molten steel slags, as will be understood in light of the disclosure herein.

With continued reference to FIGS. 1-3, each of granulators 14 and 16 is comprised of a boat-shaped tank or receptacle preferably formed of a plurality of steel plates welded or otherwise secured together to form a watertight structure. With reference to FIG. 1, the side of granulator 14 shown is constructed of a number of steel plates such as 76, 78, 80, and 82, welded together in a conventional manner to form an elongated sidewall. The opposite side of granulator 14, as well as the two sides of granulator 16, are similarly constructed. The bottom of granulator 14 is formed of a sloping plate 84 at the upstream (input) end of the granulator, a substantially horizontal rectangular plate 86 forming the central portion of the granulator bottom and a further sloping rectangular plate 88 forming the downstream (discharge) end of the granulator. Plates 84, 86, and 88 are welded to the sides of the granulator in a conventional manner to form a watertight receptacle as mentioned above.

Secured to the upstream sideplate 76, to bottom plate 84, and to the corresponding opposite sideplate (not shown) of granulator 14, is an end plate 90, which defines the end closure for granulator 14, and also serves to support a plurality of granulating jet nozzles as described more fully below.

The entire granulator structure is supported by a steel framework including a plurality of spaced vertical legs 92 on both sides of the receptacle and a pair of like side frame members 94, at the top of the receptacle, secured to legs 92 and to the sideplates 76,78, etc. Legs 92 are arranged to rest on floor vessel 40 to achieve the desired slope for chute 64. As will be understood, a like construction is employed for granulator receptacle 16.

With reference to FIG. 2b, granulating and cooling water is injected into granulator 14 by means of a plurality of nozzles including a pair of vertically spaced horizontal nozzles 96 and 98 and a pair of horizontally spaced vertical auxiliary nozzles 100 and 102 positioned at the sides of upper primary nozzle 96 (see FIG. 3). Nozzles 96, 98, 100, and 102 are connected by means of a conduit 103 (see FIG. 1) to a common water feedpipe 105. Granulating water may be obtained from any convenient source such as the local water mains or a nearby river. A water pump 106 of conventional design connected by pipe 107 to the water supply, provides the granulating and cooling water through common feedpipe 105 in the required quantities as amplified below.

A water strainer 108, e.g., a Y-pattern sediment strainer such as manufactured by the V. P. Anderson Company of Cleveland, Ohio, or the "Aloyco" Y-type strainer, manufactured by the Walworth Company of New York City, N.Y., is inserted in feedpipe 105 to remove any debris which might obstruct nozzles 96, 98, 100, and 102. Strainer 108 should be capable of removing all particles of size equal to or greater than the smallest dimension of granulating nozzles 96, 98, 100, and 102, e.g., less than ⅜ inch in the specific example described below. Use of water strainer 108 is desirable since even a small particle obstructing the tips of the granulating nozzles may cause the injected water jetstream to be split, whereby enough molten steel slag may fall directly into the granulator without undergoing the granulating and cooling effects of the water jets to present a danger of explosion. A conduit 104, similar to conduit 103, provides the water supply to four nozzles in granulator 16 of substantially identical construction as nozzles 96, 98, 100, and 102 in granulator 14.

An extensive discussion of the construction and assembly of nozzles 96, 98, 100, and 102, and of pertinent relationships therebetween, may be found in several of the aforementioned copending applications, e.g., Ser. No. 428,519 and Ser. No. 632,825, and therefore is not repeated herein. Briefly, however, the input ends 97 and 99 of primary nozzles 96 and 98 are connected to conduit 103 by short connecting pipes 109 and 111. The nozzles are constructed in any suitable fashion, e.g., of a plurality of welded metal plates, and are designed to produce substantially uniform jet streams at the discharge orifices 110 and 112.

Nozzles 96 and 98 project through a pair of slots 114 and 116 in granulator end wall 90. The nozzles are supported in any convenient manner, e.g., by means of a pair of rearwardly depending brackets such as 118 secured as by welding to opposite sides of the granulator end wall 90 and each terminating in an outwardly turned flange such as 122 at the rear end thereof. A pair of like vertically spaced rectangular mounting plates 124 are secured to flanges 122. A rectangular slot 128 is cut in each of plates 124 to receive nozzles 96 and 98 with the discharge ends projecting slightly beyond granulator end wall 90 as shown in FIG. 2b.

In regard to the configuration of the nozzles, it has been found that most satisfactory operation is achieved when the stream of molten slag discharged into granulator 14 through discharge chute 64 intercepts a broad, flat, generally horizontal jetstream of water produced by each of primary nozzles 96 and 98, the jetstreams being somewhat wider than the stream of slag. The vertical thickness of the flat, horizontal water jets may be quite small. Thus, discharge openings 110 and 112 of primary horizontal nozzles 96 and 98 are preferably in the form of narrow, rectangular slits having the longer dimensions thereof extending transversely of granulator end wall 90, i.e., into the plane of the drawing in FIG. 2b. While the dimensions of discharge openings 110 and 112 may be subject to some variation, excellent results have been achieved with horizontal nozzles 96 and 98 having discharge openings approximately ⅜ inch high, and about 14, 18, or 22 inches wide. Detailed discussion of horizontal primary nozzles like 96 and 98 may be found in the aforesaid parent applications Ser. No. 428,519 and Ser. No. 126,792. Obviously, similar considerations apply to the primary horizontal nozzles associated with granulator 16.

As explained in the parent applications, other factors are significant in achieving a satisfactory or even an operative system with the basic granulator arrangement. One such factor is the relationship between the molten slag input rate and the velocity and quantity of water injected through primary nozzles 96 and 98. It has been found that the steel slag granulation system of the present invention preferably should be operated according to certain conditions as set forth below.

1. In particular, normal steel making operations are found to result in the discharge of molten slag at rates varying from less than about 2 tons per minute up to as high as about 8 tons per minute. Under such circumstances, granulating water should be supplied through primary nozzles 96 and 98 such as described above with a jet velocity in feet per second and a flow in gallons per minute which varies in relation to the rate at which the molten slag is discharged into the granulator. A suitable relationship between varying rates of slag input and the velocity and flow of granulating and cooling water through a single nozzle, i.e., upper nozzle 96, is given in Table 1 below.

| Slag Input (tons/min.) | Minimum Water Jet Velocity (f.p.s.) | Minimum Quantity (g.p.m.) |
| --- | --- | --- |
| Up to 2 | 25 | 400 |
| 2–4 | 30–36.5 | 500–600 |
| 4–7 | 73–110 | 1200–1800 |
| 7–8 | 110–122 | 1800–2000 |

TABLE 1

Minimum Water Requirements

Primary Nozzle 96 Only

The velocities given in Table 1 are based on injection of the entire stated minimum water quantity through upper nozzle 96. If both horizontal nozzles 96 and 98 are to be employed, the specified flow may be provided by the combined use of both nozzles. In that case, the jet velocities will be 36.5–35 f.p.s. for slag inputs of between 4 to 7 tons per minute, and 55–61 f.p.s. for a slag input of 7 to 8 tons per minute. However, the velocities for slag inputs of up to 4 tons per minute are preferably at least those given in Table One whether using one or two granulating nozzles.

2. For most satisfactory operation, it is found that the total quantity of water supplied to receptacles 14 and 16 during operation should exceed the minimum required for injection through nozzles 96 and 98. In fact, the total quantity of water introduced should be at least about 400 gallons of water per minute per ton of steel slag per minute discharged into the granulator. Preferably, however, water should be introduced at a higher rate, e.g., about 900 to 1,350 gallons of water per minute per ton of steel slag per minute discharged into the granulator. Most satisfactory results, in terms of minimum vaporization of granulating and cooling water, are achieved by introduction of at least about 1,350 to 1,600 gallons of water per minute per ton of steel slag discharged per minute. The input water should preferably be at any typical water main temperature, e.g., 60°–70° F. However, furnace cooling water or other plant used water may be employed having a temperature of about 100° F. or above, if necessary.

3. Generally, it is preferable that the water requirements set forth in Paragraph 2 be satisfied by supplying all water through primary nozzles 96 and 98, or, as amplified below, partially through auxiliary nozzles 100 and 102 as well. Where the auxiliary nozzles are not employed, and if the requirements of Table One can be met with a lower quantity of water through nozzles 96 and 98 than the total required by Paragraph 2, the excess may be supplied by other means, e.g., a water pipe of suitable size may be secured to end wall 90 of granulator receptacle 14 below nozzles 96 to supply additional water to the receptacle by conduit from a suitable source. However, the safest and best approach is to introduce all the required water through nozzles 96 and 18. This increases the effectiveness of the water jets for breaking down the molten steel slag into small particles to achieve more rapid and more efficient slag cooling and granulation, and helps assure smaller resultant granulated slag particles for more efficient hydraulic slurry transportation as amplified below.

4. In light of the foregoing, good results can be achieved by injecting two jetstreams of water into granulator receptacles 14 and 16 through primary nozzles 96 and 98 according to the following: (a) For molten slag input of up to about 2 tons per minute, inject two water streams with jet velocity of about 36.5 to 61 f.p.s., and about 1,200–200 g.p.m. through both jets. (b) For a molten slag input rate of 2 to about 4 tons per minute, inject two water jetstreams at a velocity of at least 61 to 122 f.p.s., and about 2,000–4,000 g.p.m. through both jets. (c) For a molten slag input rate of 4 to about 7 tons per minute, inject two water jetstreams at a velocity of at least about 91 to 146 f.p.s., and about 3,000–5,000 g.p.m. through both nozzles.

Auxiliary vertical nozzles 100 and 102 are constructed generally similar to primary horizontal nozzles 96 and 98. As illustrated in FIG. 2b, side nozzle 100 projects through a generally rectangular aperture 134 in granulator end wall 90, while nozzle 102 projects through a like aperture on the opposite side of granulating nozzle 96. Short connecting pipe segments 130 of like construction are provided between the input ends 132 of the auxiliary nozzles 100 and 102 and common water conduit 104. The nozzles are supported in any suitable fashion, e.g., with connecting pipes 130 projecting through a pair of apertures 135 and plate 124 and an aligned pair of apertures 136 in flanges 122 in mounting brackets 118.

As in the case of granulating nozzles 96 and 98, most satisfactory operation for side nozzles 100 and 102 is found to result for nozzle discharge openings 137 having generally narrow elongated cross sections. The nozzles are so positioned that the jet stream issuing through discharge orifice 110 of upper primary nozzle 96 lies intermediate the upper and lower edges of the streams issuing from side nozzles 100 and 102. Preferably, however, horizontal nozzle 96 is so disposed that the jetstream issuing therefrom lies at or below the center of streams issuing from the vertical side nozzles to produce a combined water stream having a generally U-shaped cross section. (The latter term is intended to include the specific H-shaped cross section shown in FIG. 2b.)

Further details of the above-described construction, as well as an extensive discussion of its advantages, may be the above-referred to copending application, Ser. No. 632,825. Briefly, however, as described therein under many circumstances the stream of molten slag being discharged into the granulator is found to possess a trajectory including substantial velocity components transverse to the primary direction of slag stream flow. Such a condition results in portions of the slag stream failing to intercept the horizontal jetstreams produced by nozzles 96 and 98 with resulting nonuniform granulation and cooling of the molten slag. By employment of the vertical side nozzles 100 and 102, transversely moving portions of the slag stream intercept the vertical portions of the water jet, while the main body of the slag stream continues to intercept the horizontal water jets. This has been found to improve the uniformity of system operation under the above-mentioned condition.

The flow rate and jet velocity of the water injected through auxiliary nozzles 100 and 102 is found to be governed by the various considerations discussed above in connection with nozzles 96 and 98 in the paragraphs numbered 1–4. However, because the portion of the stream of molten slag having the undesirable transverse trajectory is small in comparison to the overall slag tonnage, the required flow rate and jet velocity is less than the minimum specified in Table One above.

5. Specifically, it is found that satisfactory operation is achieved if at least about 60 percent, and preferably about 70 percent, of the total water supplied to the granulators is equally divided between the primary nozzles 96 and 98, with the remaining quantity being equally divided between auxiliary vertical nozzles 100 and 102. Again, it should be emphasized that the requirements of Paragraph 1 above must be met in any event. Thus, with reference to Paragraph 4 above, good results are obtained, with the added benefit of improved granulation of transversely flowing slag, if water is injected into the granulator with a minimum rate of flow and minimum velocity through the various nozzles depending upon the rate of molten slag input to the granulator in accordance with Table 2 below:

| Slag Input | Nozzles 96 and 98 | | Nozzles 100 and 102 | |
|---|---|---|---|---|
| (tons/min.) | vel. (fps) | flow (gpm) | vel. (fps) | flow (gpm) |
| Up to 2 | 25–42 | 420–700 | 19.2–32 | 180–300 |
| 2–4 | 42–84 | 700–1400 | 32–64 | 300–600 |
| 4–7 | 65.5–105 | 1100–1750 | 48–80 | 450–750 |

TABLE 2

Water Requirements

For Preferred Operating Conditions

Nozzles 96, 98, 100, and 102

6. By way of example, the following conditions are representative of suitable operation of an O.S.M. steel slag granulating system in accordance with this invention, under typical conditions: A total quantity of as much as 37.5 tons of molten O.S.M. Steel slag may be discharged into the granulator system over a period of approximately 10–11 minutes; there may be significant variation in the sought-for average 3.5 tons per minute rate for slag poured into the granulator due to practical difficulty in getting a precisely controlled pour. Under such conditions, water is provided to the granulator at the rate of approximately 3,500–4,000 gallons per minute. Of this, approximately 2,800 gallons per minute is provided by the horizontal nozzles 96 and 98 with approximately 1,400 g.p.m. injected through each nozzle at a velocity of about 84 f.p.s. The remainder, i.e., approximately 1,200 g.p.m. is equally divided between vertical nozzles 100 and 102, and is injected at a velocity of about 64 f.p.s. Of course, it should be recognized that the above-described nozzle construction and mode of operation is employed in granulator 16, as well as in granulator 14. Accordingly, in the interest of brevity, further description of this aspect of the invention will be omitted herein.

Granulators 14 and 16 are so constructed that a portion of the water entering the granulator through nozzles 96, 98, 100, and 102 is retained at the bottom of the receptacle in the form of a relatively shallow bath 142. The level of bath 142 is controlled by overflow means 144 comprising an aperture 146 cut into one of the granulator sideplates, such as 80, at the desired bath level. A water overflow chamber constructed of a plurality of welded plates is secured around overflow opening 146 and is connected to an overflow pipe 148 for disposing of the excess water in any convenient manner.

As explained in parent application Ser. No. 428,519, the presence of water bath 142 is quite desirable in providing additional cooling for the granulated slag but the bath is maintained at a level below the lower primary nozzle 98 to assure that the molten slag intercepts the granulating jets at a level above the bath.

As will be appreciated, suitable means must be provided to move the granulated slag particles from the vicinity of the granulating nozzles and also from the granulator receptacles themselves. One arrangement for achieving this result is a continuous rake conveyor generally designated at 150 in granulator 14. Rake conveyor 150 comprises a plurality of endless chains 154 (e.g., 3) and a series of attached rectangular steel flights 156 which serve as scrapers or rakes for the granulated slag particles. Chains 154 are supported by means of a plurality of drive sprockets 158 rigidly secured to a drive shaft 160 at the upstream end of the granulator receptacle, and by a plurality of idler sprockets 162 secured to an idler shaft 164 at the downstream or discharge end of the granulator. Shafts 160 and 164 are rotatably supported in suitable bearings mounted in any convenient fashion at the side of the granulator receptacle. Drive shaft 160 is connected, either directly or indirectly (as by a conventional pulley and belt arrangement), to a suitable drive motor (not shown), mounted in a protective housing 166 on one side of the granulator receptacle. As will be seen from FIG. 4, a similarly constructed rake conveyor 152 is employed in granulator receptacle 16. However, it should also be understood that other functionally comparable slag removal means could be employed instead of the rake conveyors illustrated.

The granulated slag particles are carried by the leading surfaces of moving rake flights 156 along the bottom of the granulator and up along sloping bottom plate 188 for further processing in the manner now to be described.

Figure 4:
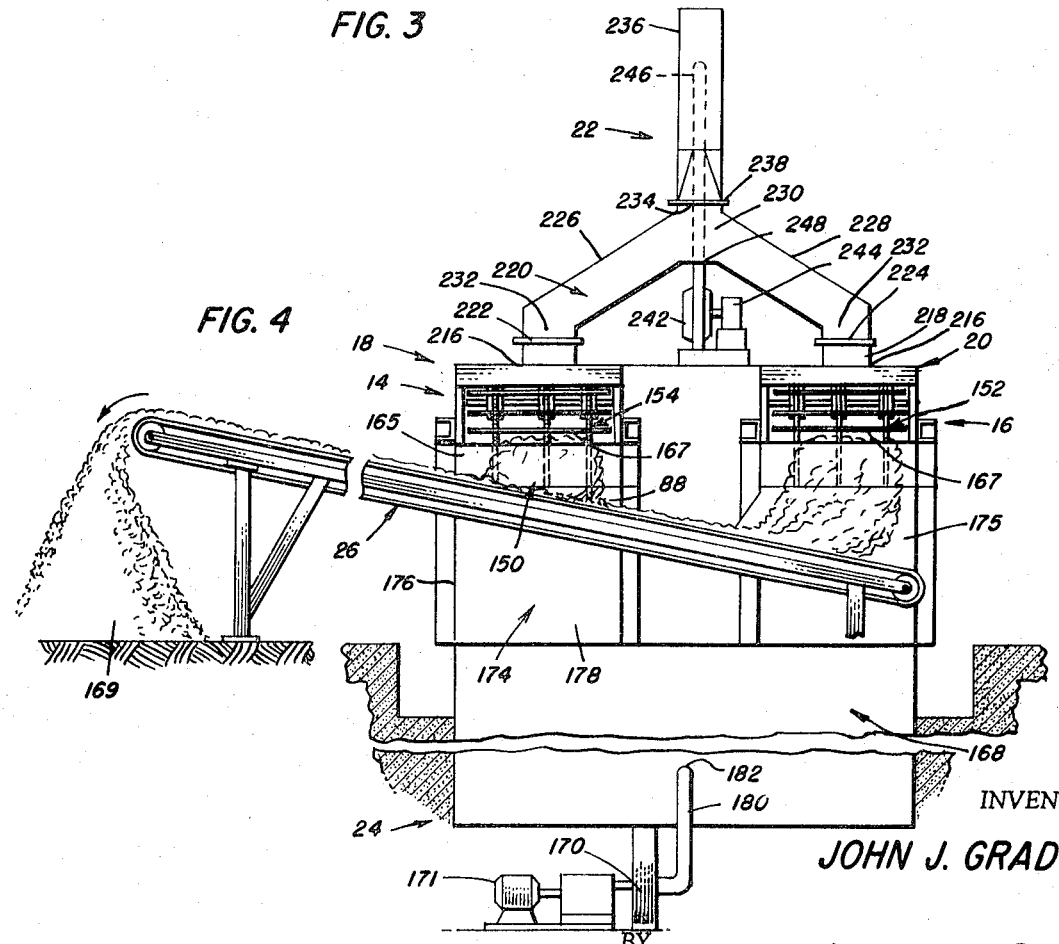
FIG. 4 is an end elevation of the portions of the system of FIG. 1 showing the portion of the system from which the granulated slag is discharged.

As previously indicated, the preferred means for removing the granulated slag particles from the granulator receptacles 14 and 16 is a hydraulic pumping arrangement wherein the granulated slag is transported in the form of a water-slag particle slurry. Accordingly, the system of the present invention includes hydraulic transport system 24 having an auxiliary mixing tank 168 and a slurry pump 170, commonly associated with granulators 14 and 16 as illustrated in FIGS. 1 and 4.

Granulated slag particles are carried by rake conveyors 150 and 152 to the downstream end of the granulators and onto the sloping granulator bottom plates 88. From here, the slag particles and a substantial portion of the injected water are discharged into mixing tank 168 through a plurality of perforations 172 in bottom plates 88. Funnel means 174, constructed of a pair of triangular side plates 176 and a rectangular end plate 178, is attached to bottom plates 88 to guide the slag particles and the water into mixing tank 168. As will be apparent from FIG. 4, a second funnel means 175, identical to funnel means 174, is associated with a perforated bottom plate (not shown) in granulator receptacle 16 identical to perforated bottom plate 88 in granulator receptacle 14, to guide the granulated slag from receptacle 16 into common mixing tank 168 as explained above.

The perforations in the sloping bottom plates 88 are chosen to screen mixing tank 168 against the entry of material of greater than a predetermined size to prevent possible damage to the pumping system and also, since extremely large particles cannot efficiently be transported in the form of a slurry. In practice, perforations 172 may be formed to admit slag particles having a maximum size of about 2 inches.

The larger material not passing perforated plates 88 continues to be displaced upwardly by the leading edges of the rake conveyor flights 60 until the particles are propelled out of the granulator receptacles 14 and 16 through openings 165 and 167 at the downstream ends. The oversized slag particles fall onto oversized particle conveyor 26, as illustrated in FIGS. 1, 3, and 4, supported by any convenient means, (omitted from the drawing for clearer illustration of other parts), adjacent to the end openings 165 and 167 of the granulator receptacles.

Oversized particle conveyor 26 is preferably a motor-driven continuous belt conveyor of any commercially available type, such as those commonly used in gravel pits or quarries. One suitable type is the Telsmith B–G Continuous Conveyor, manufactured by the Smith Engineering Works, Milwaukee, Wis. Since such devices are readily available, detailed description of their construction is not necessary. In any event, it will be understood that the oversized slag particles are carried along by conveyor 26 to the desired location for disposal or temporary storage as shown in FIG. 4. Under most conditions, however, it is found that a large portion of the granulated slag passes through perforated plates 88 and only a small percentage, e.g., less than one percent must be handled by the oversized particle conveyor 26.

Referring again to the hydraulic transport system 24, the slag-water slurry collecting in mixing tank 168 is removed by means of a large diameter abrasion resistant pipe 180 communicating with the interior or mixing tank 168 through an aperture 182 at the bottom of one of the tank sidewalls.

The discharge end of pipe 180 is connected as the input to a dredge pump 170 which is preferably a commercially available, heavy-duty, centrifugal pump of any suitable design, such as the "Morris"-type 10GMA–28. The latter, driven at about 1,150 r.p.m. by a suitable motor 171 of approximately 200 hp. capacity, is capable of handling a slurry flow of about 3,500–4,000 g.p.m. plus a solid (i.e., slag particle) content of 3–4 tons per minute.

As shown in FIG. 1, connecting pipe 180 preferably includes an elongated vertical portion 184 whereby pump 170 is disposed a substantial distance below the bottom of mixing tank 168. This is desirable to provide a pressure head at the inlet of pump 170 to minimize inefficiency and sealing or related problems which may arise in the operation of pump 170 when the water-slag slurry in mixing tank 168 is at a highly elevated temperature, e.g., approaching the boiling temperature of water. As will be appreciated, under certain circumstances, dredge pump 170 may be located on a lower floor of the steel making shop to provide the desired head with respect to the mixing tank. Alternatively, as where it is necessary to locate the granulator system in the yard between shops, the required head may be achieved by locating pump 170 in a well 186 dug out beyond the downstream end of the granulator receptacles 14 and 16. Pump 170 is connected by means of a large diameter abrasion resistant outlet pipe 188 to the dewatering and slag disposal portion of the system shown in FIGS. 5 and 7, and described in detail below.

The hydraulic slurry pumping system 24 is described in considerable detail in aforementioned copending application Ser. No. 535,143, and in the interest of brevity, such description is omitted here. However, certain significant operating conditions have been discovered which should be satisfied for optimum utilization of the slurry pumping system.

It is found that factors pertinent to most desirable operation include the minimum slurry velocity in discharge pipe 188, the concentration of solids in the slag water slurry and the slurry temperature in relationship to the head at the input of pump 170.

It is found that best operation is achieved with: (a) minimum slurry velocity in discharge pipe 180 of at least about 17 feet per second; (b) the weight of solids suspended in the slurry not significantly exceeding about 17 percent; and (c) a slurry temperature in mixing tank 168 not significantly exceeding approximately 185° F. (e.g., up to approximately 200° F.).

While many complex factors are significant in design of the system to meet the above requirements, it has been found that adjustment of several parameters results in quite satisfactory operation. Specifically, it is found that for the Morris-type pump 170 operating in the manner described above, input pipe 180 should have an inside diameter of at least about 12 inches and should include a vertical portion 184 to establish a head of about between 10 and 18 feet on the pump input. An output pipe 188 should have an inside diameter of approximately 9 inches, and may be of substantial length, e.g., as much as 1,700 feet or more.

In regard to the concentration of solids in the slurry, it will be appreciated that the rate of flow of molten slag into the granulator receptacles 14 and 16, as well as the water input through the jet nozzles 26–30 are significant factors which must be correlated to achieve the desired water to slag ratio. One suitable technique for adjusting this ratio is to control the concentration of the slurry in mixing tank 168 by injecting additional water as necessary. This may be accomplished by any suitable valve-controlled piping, not shown in the interest of clarity. Likewise, the temperature of the slurry can be controlled by the injection of additional cooling water into mixing tank 168.

However, control of the solids concentration, as well as the temperature by injection of sufficient quantities of water into the granulator receptacle itself by the jet nozzles, is preferred as set forth more fully in the aforementioned application, Ser. No. 535,143.

As previously mentioned, granulator receptacles 14 and 16 are fitted with steam hoods 18 and 20, respectively, to prevent the uncontrolled emission of steam generated during the granulating process. As explained in detail in my copending application Ser. No. 629,755, this is extremely desirable since maximum efficiency in the operation of the granulating system requires its location in as close as possible proximity to the steelmaking furnaces. Uncontrolled venting of steam in such areas may pose an inconvenience or even a safety hazard for nearby workers.

Steam hood 18 is comprised of a side frame 190 having a pair of elongated side members 192 as best illustrated in FIG. 3. The upstream ends of side members 192 each terminate in a downwardly depending portion 194 secured to granulator end wall 90 as shown in FIG. 2. At the downstream end side members 192 each terminate in an angle portion 196 having a sloping upper leg 198 and a second substantially vertical leg 200 secured at the extreme end of downstream sideplate 82.

With reference to FIGS. 1 and 3, the top of steam hood 18 is formed of a plurality of substantially rectangular cover plates 202 connected together in any suitable fashion, as by a plurality of upwardly turned peripheral flanges 204 butt-welded together and to side frame members 192. Similarly, the sides of steam hood 18 are formed of a plurality of generally rectangular plates 206, secured together and to side frame members 192 by a plurality of butt-welded peripheral flanges 208.

Best results are obtained if steam hood 18 does not completely close off the top of granulator receptacle 14. Accordingly, a pair of small rectangular plates 210 are secured to the adjacent ones of plates 202 and to side frame members 192 in the manner described above. Plates 210 are positioned in spaced relationship as shown in FIG. 3, at the upstream end of the granulator to define a recess 212 which exposes slag discharge chute 64 to the atmosphere.

No vertical plates corresponding to plates 206 are positioned on the sides of discharge chute 64 so that the entire end of the granulator receptacle above end plate 90 is exposed to the atmosphere.

At the downstream end, a narrow transversely elongated cover plate 214 is secured between upper legs 198 of side frame end portion 196. However, as shown in FIG. 4, the area between vertical leg portions 200 of frame end portions 196, is completely open to define the discharge opening 167 above sloping bottom plate 88. This permits free inflow of air to the granulator receptacle, as amplified below.

As will be appreciated from FIGS. 1–4, construction of steam hood 20, associated with granulator receptacle 16, is substantially identical to that described above in regard to steam hood 18.

One of the cover plates 202 at the downstream ends of each of granulator receptacles 14 and 16 is provided with a generally rectangular opening 216. Surrounding each opening is an upwardly projecting connecting collar 218 formed in any suitable manner, e.g., of a short length of rectangular metal ducting having an inner lining of a suitable alkaline resistant material. A common breeching 220 (see FIG. 4), having an inverted V-shaped configuration, is attached as by pairs of welded flanges 222 and 224 to the respective connecting collar portions 218 on steam hoods 18 and 20.

Breeching 220 is formed of a pair of separate arm portions 226 and 228 welded or otherwise secured to a central connecting portion 230 at the upper ends. Each arm terminates in a short vertical segment 232 at the lower ends, which segments are attached to the respective connecting collar portions 218 on steam hoods 18 and 20.

Arms 226 and 228 and central connecting portion 230 are formed of appropriate lengths of metal ducting, e.g., having a square cross section 8 inches on a side, and having an internal lining of alkaline resistant material. Breeching 220 is constructed of sufficiently heavy gauge metal to form a substantially self-supporting structure, and may additionally be supported by suitable bracing (not shown) if necessary.

Central connecting portion 230 terminates in a vertical collar portion 234 to which is attached a tubular metallic exhaust conduit or stack 236, for example, by means of a pair of butt-welded flanges 238. As shown in FIGS. 1 and 4, exhaust stack 236 is of relatively short length; however, it should be understood that a greatly extended exhaust conduit may be necessary to reach a sufficiently remote location for convenient and safe venting of the collected steam.

From the foregoing, it may be seen that steam exhaust system 22, including steam hoods 18 and 20, breeching 220, and exhaust stack 236, cooperate to form a temporary collection chamber and disposal conduit for the generated steam.

The construction illustrated in especially convenient for use with a pair of adjacent granulator receptacles such as 14 and 16. On the other hand, should more than two granulators be employed in side-by-side relationship, breeching 220 may readily be modified to include additional arms, one communicating with each granulator.

The collected steam may have some tendency to rise through breeching 220 and exhaust stack 236 of its own accord. However, due to the large quantities of steam which may be generated under certain granulator operating conditions, a forced ventilation system for breeching 220 and stack 236 is preferably employed.

One suitable type of forced ventilation system would be a direct arrangement in which a simple air pump or fan is disposed within exhaust stack 236 for drawing the collected steam out of breeching 220. On the other hand, because of the corrosive and abrasive nature of the fine particles which may be carried in the steam, an indirect arrangement in which the moving parts of the ventilating system are not themselves subjected to the steam, is preferred.

Accordingly, an aspirator arrangement 240, illustrated in FIGS. 1, 3, and 4, is included in steam exhaust system 22. Aspirator 240 comprises a blower 242 driven by an electric motor 244 in any conventional manner. Blower 242 is coupled to a narrow elongated injection tube 246 which extends from the output of the blower through an aperture 248 in the bottom of central connecting portion 230 a substantial distance, e.g., several feet, into exhaust stack 236. The construction and operation of aspirator 240, as well as of the other above-described portions of steam removal means 22, is discussed in considerable detail in the above-mentioned copending application Ser. No. 629,755, and such detailed description is omitted here in the interest of brevity.

In short, operation of blower 242 causes a relatively high-speed stream of air to be emitted from injection tube 246 into exhaust stack 226. The rapid movement of this airstream establishes a region of depressed pressure in the exhaust stack which is communicated through arms 226 and 228 of breeching 220, and openings 216 in steam hoods 18 and 20, to produce a pressure differential between the interior of the steam hoods and the breeching. The resulting airflow from the open ends of the steam hoods 18 and 20 into breeching 220 results in the steam generated during granulator operation being drawn up through the breeching and on into exhaust stack 236.

As mentioned above, large quantities of steam may be generated under certain conditions of granulator operation, and exhaust system 22 must be capable of satisfactory operation even at these times. Among the factors which have been found to affect the quantity of steam generated are the nature and flow rate of the molten slag, and the velocity, flow rate, and temperature of the water injected through the jet nozzles. As will be appreciated, satisfactory operation requires proper correlation of the variable design parameters for exhaust system 22 with the above-described operating variables. These factors are discussed extensively in the aforementioned application Ser. No. 629,755, particularly in terms of the volumetric exhaust capacity of the aspirator 240 and the associated exhaust conduit 236. In general, it is found that a minimum steam exhaust capacity varying from less than about 1,000 cubic feet of steam per minute under ideal conditions to about 300,000 cubic feet of steam per minute for most severe conditions, is necessary.

Referring now to FIG. 5, there is shown the slag dewatering and stockpiling, and the water filtration and disposal portions of the system generally denoted at 250. Subsystem 250 comprises slag dewatering apparatus 252, a stockpiling conveyor 254, located directly below dewatering apparatus 252, first water filtration apparatus 256, and second filtration apparatus 258. It should be understood that FIGS. 1 and 5, arranged as indicated in FIG. 6, comprise an overall view of the system of the present invention.

Slag dewatering apparatus 252 comprises an oscillating separating tank 260, and associated equipment including a flume 262 fed by slurry pipeline 188, a water discharge conduit 264, and a framework 268 for supporting the tank 260 above ground level 270.

Flume 262 is a wide, sloping trough having a bottom member 274 and like side members 276. Flume 262 is supported at a slight angle to the horizontal, e.g., between about 5° and 10° in any convenient manner, such as by a framework omitted from the drawing for clearer illustration of the other parts. A series of vertical rods 278, project upwardly from flume bottom member 274 and serve as velocity killers to reduce the velocity of the slurry entering settling tank 260.

As mentioned, settling tank 260 is of the continuously oscillating type, such as is frequently employed in sand and gravel quarries, and is commercially available from several sources. The settling tank is comprised of a large metal hopper 280, generally in the form of an inverted pyramid. Hopper 280 is constructed in any suitable fashion, as of a plurality of properly shaped welded plates. Hopper 280 is freely supported by a pair of knife-edged bearings 282, as illustrated, or in any other suitable fashion on framework 268 at a point somewhat downstream (i.e., toward the right in FIG. 7) of its center of gravity. A baffle plate 284 extends completely across hopper 280 and is secured, as by welding, to the opposite sidewalls of the hopper, preferably directly above knife-edge bearings 282.

As illustrated, hopper 280 tapers downwardly, the taper being defined by a pair of sloping plate members 286 and 288, forming the upstream and downstream sides, respectively, of the hopper, and by additional side plates 290 connected by a short horizontal portion 292 at the truncated apex of the inverted pyramid.

Slag discharge from hopper 280 is provided by means of a drainage opening 294 at the bottom of backplate 286. Opening 294 is normally closed by means of a drainage gate 296, movably supported as by means of a bellcrank 298 attached through a sloping connecting rod 300 to a counterweighting mechanism generally denoted at 302.

Counterweighting mechanism 302 includes a horizontally elongated balancing arm 304 terminating in a relatively high mass member 306 which serves as the counterweight. Balance arm 304 is pivotally secured in any suitable fashion at 308 to the upper portion of hopper backmember 286, and rests on a suitable support such as knife-edge bearing 310 mounted on framework 268. Connecting rod 300 is pivotally secured to balancing arm 304 to operate drainage gate 296 when hop 280 oscillates on bearings 282 as now described.

In operation, the granulated slag-water slurry pumped through pipeline 188 by pump 170, is discharged from flue 262 into hopper 280. The slurry strikes baffle 284 and is deflected back to fill the hopper.

As the slurry level builds up, the heavy slag particles settle out of the water to the bottom of the hopper while the water flows under baffle plate 284. When it reaches a sufficient level, the water flows out over the downstream end of hopper 280, e.g., over a transverse spillway to a collection trough 312. The water is then conducted into discharge pipeline 264 which is connected to first filter 256.

When the weight of the slag collecting at the bottom of hopper 280 becomes sufficient, the unbalance about knife-edged bearings 282 will cause the hopper to tilt slightly in the counterclockwise direction. Since counterclockwise rotation of balance arm 304 is prevented by support bearing 310, bellcrank 298 and attached drainage gate 296 remain fixed, while pivoting of the rotating hopper causes drainage opening 294 to be exposed. This results in discharge of the relatively dry granulated slag particles on to the stockpiling conveyor 254 as amplified below.

When a sufficient quantity of slag has been discharged, hopper 334 becomes unbalanced in the opposite direction, causing it to swing back (in the clockwise direction) toward its initial position. Counterweight 306 maintains balance arm 304 in a horizontal position, causing drainage gate 296 to be closed and preventing further slag discharge. Since only a portion of the slag collected at the bottom of hopper 280 is discharged at a given time, there is always maintained a relatively deep slag bed in the hopper above which the water is collected. This prevents discharge of water through drainage gate 296. At the same time, the continuous oscillating motion of hopper 280 imparts an oscillatory movement to the slurry which promotes separation of the slag and water and results in a more rapid settling out of the slag particles.

As previously mentioned, settling tank 260 is a commercially available device frequently used for dewatering sand or like material. One suitable device of this type is the so-called Telsmith Sand Tank, manufactured by the aforementioned Smith Engineering Works. Such Telsmith Sand Tanks are capable of handling 1,700 or more gallons of slurry per minute and of extracting about 135 tons of granulated slag per hour, (i.e., approximately 2.25 tons per minute). Since maximum load operation of the granulators may produce slurry flow in excess of these amounts, a buffer tank, including a recirculating pump and a controlled slurry takeoff as described above, may be connected between slurry pipeline 188 and flume 262. Preferably, however, a series of sand tanks 260, operating in tandem, should be employed with sufficient overall capacity to handle the maximum expected slurry flow. As will be appreciated, suitable connecting troughs and runners to distribute the slurry uniformly among all of the settling tanks employed, are connected at the output of pipeline 188 and feed a flume 262, associated with each settling tank.

As previously mentioned, the substantially dry granulated slag discharged through drainage opening 294 at the bottom of hopper 280, falls onto stockpiling conveyor 265 and is thereby transported to a nearby stockpile 218. Conveyor 265 comprises a continuous motor-driven belt 316 of heavy duty design, and a framework 320 of generally triangular configuration pivotally secured at 322 under hopper 280.

Reversible drive means 324 including a drive wheel 326 and a drive motor 328, is mounted at the apex of triangular framework 320 to propel conveyor 254 in a wide arc about pivot point 322. This permits distribution of the dried granulated slag output of hopper 280 over a relatively wide area.

Conveyor 254 is preferably a radial stacking conveyor such as manufactured by the Barber-Greene Company of Aurora, Ill., or any other commercially available equivalent. Since such apparatus is readily available, further description of its construction is omitted in the interest of brevity.

Water flowing into settling tank collection trough 312 passes through discharge conduit 264 to the input of first filtration apparatus 256. Filter 256 comprises a large settling basin 330 having straight sides 332 and a sloping bottom 334. Basin 330 is of large size, e.g., having a diameter of as much as 100 feet or more and is preferably formed of cast concrete or the like directly supported on or below ground 336 or in any other desired fashion.

A large metal framework 338 extends diametrically across basin 330. Framework 338 terminates in a pair of downwardly depending legs 340 resting on opposite sides of the peripheral rim 342 of the basin.

Supported at the center of framework 338 is a motor housing 344, within which is secured a suitable electric motor for rotating a vertical drive shaft 346 supported also by framework 338 and extending downward to the lowermost point 348 on tank bottom 334.

Attached in any suitable manner near the lower end of drive shaft 346, are a pair of rake arms 350 and 352 extending outwardly along sloping bottom 334 to vertical sides 332. Rake arms 350 and 352 are slightly spaced above and are disposed substantially parallel to sloping tank bottom 334, as illustrated in FIG. 5. Secured to the undersides of rake arms 350 and 352 are a series of scraper plates 354 which serve to loosen and remove the solid material and sludge accumulated on tank bottom 334 as described below.

The lowermost point 348 of tank bottom 334 is provided with a drain opening 356 communicating with a sump 358 for receiving the residual solid material extracted from the water entering filter 256 in the form of a sludge or thick suspension of very fine slag particles and dust. A cooperating drainage pump 360 of any suitable type is adapted to evacuate the material collecting in sump 358 through a suitable drainpipe 362. An overflow pipe 364 extending through an aperture 366, near the top of tank sidewall 332, serves as a discharge conduit for the relatively clean water from which the slag particles have been extracted.

In operation, the water output of settling tank 260 enters filter 256 through feed pipe 264, e.g., near the center of basin 330. Since the latter is quite large, a substantial quantity of water accumulates in a relatively calm state, whereby the heavy solid particles settle slowly to the bottom. The clarified water passes out through drain 364 and is sufficiently clean for direct discharge into nearby sewers or rivers.

As previously mentioned, the solid content of the water settles to the bottom of the basin and forms a relatively thick sludge or a water suspension of extremely fine solid particles. Due to the sloping configuration, a portion of the sludge falls to the lowermost point 348 at the bottom of the tank, and is discharged through drain opening 356 into sump 358. The remainder tends to accumulate on the tank bottom.

To prevent such accumulation, rake arms 350 and 352 are slowly rotated by drive shaft 346 whereby the attached scraper blades 354 continuously scour tank bottom 334 to remove the settling sludge. The drive motor for drive shaft 346 preferably turns at an extremely slow speed so that the linear velocity of the outer portions of rake arms 350 and 352 is kept quite small. This minimizes disturbance of the settling process since rapid motion of the rake arms would tend to keep the solid material in suspension. The sludge removed from tank bottom 334 by scraper blades 354 flows down along the sloping tank bottom through drain 356 into sump 358 and is evacuated as explained above through drainpipe 362.

The outlet end of drain pipe 362 is connected to second filtration apparatus 258, which operates to remove a substantial portion of the water remaining in the sludge output of first filter 256. Filter 248 is preferably a rotating drum vacuum filter such as the Horizontal Rotary Filter manufactured by the aforementioned Dorr-Oliver Company, or any commercially available equivalent. Filter 258 includes a housing 336 having a shallow well 368 at the bottom for receiving the sludge discharged by drainpipe 362. A hollow cylindrical drum 370 formed of an extremely fine wire mesh is mounted in housing 366 and is adapted for rotation about a central axis 372 by suitable means such as an electric motor (not shown). Drum 370 is so positioned that the lowermost portion 374 is submerged within the sludge accumulating in well 368. The wire screen forming drum 370 is such that a quantity of the sludge adheres to the drum as it passes through well 368, whereby a thick coating or cake 376 of the sludge material is carried upwardly as the drum rotates.

Fixedly mounted within drum 370 is a vacuum water extraction chamber 378, extending the entire length of the drum (into the plane of FIG. 5), parallel to rotation axis 372. Chamber 378 may be in the form of an elongated cylindrical sector having a pair of closed radial sides 380 and end plates 381, and a perforated arcuate outer face 382 conforming in curvature to the inner surface of drum 370. The interior of chamber 378 is connected to a suitable suction pump (not shown), for creating a partial vacuum below the upper portion of drum 370. Thus, as the cake 376 adhering to drum 370 passes over the extraction chamber open face 382, the water is drawn down through the cake and into the chamber from which it is removed in any suitable manner, such as drainpipe 384. Since the relatively thick cake 376 on drum 370 serves as a filtration bed, the extracted water is of sufficiently high purity to permit direct disposal into a nearby river or sewer.

The dried solid material remains on the outer surface of drum 370 after passing across the open face 382 of water exwherein said intermediate vessel is a tundish with an aperture located and dimensioned so that molten slag is poured into said granulator at a rate within predetermined limits.

8. An apparatus as defined in claim 7 wherein said tundish includes means for establishing a substantially fixed maximum rate of slag flow to said granulator independent of the rate of slag flow to said tundish.

9. Slag handling apparatus as defined in claim 8 wherein; said means for establishing a maximum rate of slag flow to the granulator comprises a means to permit overflow of slag from said tundish when the quantity of molten slag therein exceeds a predetermined head with respect to said tundish aperture through which molten slag is poured into the granulator.

10. Slag handling apparatus as defined in claim 1 wherein said slag feeding means comprises: a slag ladle; crane means for transporting said slag ladle from the location of a metal refining furnace to the location of said granulator; an auxiliary tundish; said crane means including means for controllably pouring the contents of said ladle into said tundish; said tundish including a pouring opening in the wall thereof, overflow means in the wall of said vessel at a predetermined level above said pouring opening to limit maximum head of molten slag in the tundish above said pouring opening; and pouring means for pouring molten slag discharged through said tundish pouring opening into said granulator receptacle to intercept said jetstreams of water.

11. Slag handling apparatus as defined in claim 1 wherein said dewatering means comprises: tank means connected to said hydraulic transport means for receiving said slag-water slurry, said tank means including means to promote separation of the water and the granulated slag particles; and means for conducting the residual water and residual granulated slag particles from said tank means after separation.

12. Slag handling apparatus as defined in claim 11 wherein said tank means includes means for classifying said granulated slag particles according to size while separating said particles from said water.

13. Slag handling apparatus as defined in claim 11 wherein said means to promote separation includes means for imparting oscillation to the slurry accumulated therein to cause settlement of slag particles to the bottom of said tank means, means for discharging a portion of said settled slag, and means at the top of said tank means for removing the residual water and for conducting the same to the filter means.

14. Slag handling apparatus as defined in claim 1 wherein said filter means comprises first means for settling remaining solid material out of said residual water in the form of a water suspension of fine slag particles, means for extracting said filtered water and conducting same to a disposal location, means for conducting said suspension from said settling means, and means for extracting a substantial portion of the water in said suspension.

15. Slag handling apparatus as defined in claim 1 wherein said hydraulic transport means comprises discharge conduit means, and pump means connected to said conduit means for propelling said slag through said conduit in the form of a granulated slag/water slurry.

16. Apparatus as defined in claim 15 wherein said slag-slurry transfer means includes an auxiliary tank for receiving granulated slag from said granulator receptacle, and means connecting said pump means to said auxiliary tank for removal of said slag from said tank and transportation through said conduit means.

17. A method of handling molten steel slag from a steelmaking furnace comprising: pouring molten steel slag into a receptacle; injecting at least one jetstream of water into said receptacle to intercept said molten steel slag to granulate said slag into particles; said water jetstream being injected at a rate of at least 400 g.p.m. per ton of molten steel slag input per minute with a water jet velocity ranging from at least about 25 f.p.s. for a slag input rate of up to 2 tons per minute to at least about 55–61 f.p.s. for a slag input rate of up to about 8 tons per minute; maintaining the water accumulating in said receptacle at a level below said water jetstream at all times while molten steel slag is being poured into said receptacle so that the molten steel slag intercepts said jetstream above the water accumulated in said receptacle; removing resultant granulated slag particles from said receptacle while granulation of the molten steel slag is in progress; transporting said granulated slag away from said granulator in the form of a water-slag slurry, separating the granulated slag from the water in said slurry to permit storage and disposal of said slag in relatively dry form; and filtering the residual water from the slurry to reduce the solids content thereof below a predetermined level.

18. A method of handling molten steel slag as set forth in claim 17 wherein said step of filtering comprises extracting remaining solid material from said water in the form of a water suspension of fine slag and dust, and extracting the fines from the water of said suspension.

19. A method of handling molten steel slag comprising: pouring molten steel slag into a receptacle; injecting at least one jetstream of water into said receptacle so as to intercept said molten steel slag to granulate the molten slag into particles; the water stream being injected with a jet velocity of at least about 25.0 f.p.s. and at least about 400 g.p.m. for a molten slag input rate of up to about 2 tons per minute, the water stream being injected with a jet velocity of at least about 30 to 36.5 f.p.s. and at least about 500 to 600 g.p.m. for a molten slag input rate of 2 to about 4 tons per minute, the water stream being injected with a jet velocity of at least about 36.5 to 55 f.p.s. and at least about 1,200 to 1,800 g.p.m. for a slag input rate of 4 to about 7 tons per minute, and the water stream being injected with a jet velocity of at least about 55 to 61 f.p.s. and at least about 1,800 to 2,000 g.p.m. for a slag input rate to 7–8 tons per minute; maintaining water accumulating in said receptacle at a level below said jetstream while said molten steel slag is being poured into the receptacle so that the molten steel slag intercepts said jetstream above water accumulated in the receptacle; removing resultant granulated slag particles from said receptacle while the granulation of the molten steel slag is in progress; transporting said granulated slag away from said granulator in the form of a water-slag slurry; separating the granulated slag from said slurry to permit storage and disposal thereof in relatively dry form, recovering the resultant water, and filtering said recovered water to reduce the solids content thereof to below a predetermined level.

20. The method as set forth in claim 19 wherein said step of transporting said slag away from said granulator comprises the steps of pumping said slag through a conduit in the form of said water-slag slurry.

21. A method of handling molten steel slag as recited in claim 20 wherein said water-slag slurry is impelled through said conduit at a velocity of at least about 17 f.p.s. from where it is removed from the granulating receptacle to where the slag is extracted from the slurry.

22. An apparatus for handling molten slag comprising: a slag granulator including a receptacle; means for feeding molten slag into the receptacle; nozzle means for injecting one or more jetstreams of water into the receptacle to intercept the molten slag, means for controlling the velocity and quantity of the injected water so as to granulate said slag into particles; means for maintaining water accumulating in the receptacle at a level below the jetstreams while said molten slag intercepts the jetstreams above the level of the water accumulated in the receptacle; means for removing the granulated slag from the granulator and transporting it away from the granulator for disposal; said means for feeding molten slag to the granulator comprising a slag container for receiving molten slag from a furnace, and means for transferring said molten slag from said slag container into said granulator receptacle at a controlled rate within predetermined limits in relation to the velocity and quantity of said water jetstream or streams.

23. Slag handling apparatus as defined in claim 22 wherein said transferring means includes means for tilting said slag container to empty said container at a controlled rate.

traction chamber 378. This solid material is removed from the drum before the latter reenters well 368 by means of a scraper plate 386 extending inwardly from housing 366 to engage the surface of drum 370. Scraper plate 386 and the sides of housing 366 form a collection bin 388 for temporarily receiving the cake 376 as it is scraped off drum 370. Bin 388 is connected to a suitable discharge spout 390 which empties onto a discharge pile 392 for the extracted solid material. The small quantity of water remaining in the fine material discharged through spout 390 either evaporates or filters down through the stockpiled material 392 and is ultimately dissipated in the earth.

If desired, the initial slag-water separating operation may be carried out in conjunction with a size classification of the solid material. If this is desired, apparatus such as indicated at 390 in FIG. 7 may be substituted for the oscillating separating tank 352 shown in FIG. 5. Classifying tank 394 is preferably one of several known devices such as the Telsmith Dewatering and Classifying Tank, manufactured by the aforementioned Smith Engineering Works. Since the latter and several functionally equivalent devices are commercially available, detailed description is not deemed necessary. Briefly, however, classifying tank 394 is comprised of an elongated settling tank portion 396 having a series of longitudinally spaced discharge valves 398a–398h. A multicompartmented classifying bin 400 is mounted below valves 398a 398h for receiving the solid material discharge as described below. The entire structure is supported on a suitable framework 402 above a plurality of stockpiles 404, 406, 408, etc., or suitable storage bins for the granulated slag material.

In operation, the granulated slag-water slurry is transported, as previously explained, through pipeline 188 by dredge pump 170 (see FIG. 1). As the slurry discharges from pipeline 188 into tank 396, the pressure and velocity constraints which maintain the granulated slag particles in suspension, are removed. As the water flows along and fills the tank, the slag particles tend to settle out of the stream. The heaviest material settles at the upstream end of the tank, i.e., in the vicinity of valves 398a, 398b, etc., while the lighter material tends to travel further and to be deposited in the vicinity of valves 398g, or 398h. Since particles of intermediate size tend to settle at various points along the length of the tank, a multigrade classification of the granulated slag particles is achieved.

In the Telsmith Classifying Tank referred to above, means are provided to open each of valves 398a–398h automatically when the accumulation of slag particles around a particular valve exceeds a preestablished quantity. This may be accomplished, for example, by a series of paddles 310a–310h rotated by suitable motors 312a–312h. As the paddles rotate, increasing weight of deposited slag particles causes increasing resistance to rotation and reduction of speed. When the reduction in speed of a given paddle indicates the accumulation of the predetermined weight of particles, the associated valve 398a–398h is opened, e.g., pneumatically, and a portion of the accumulated slag material is discharged into classifying bin 400. Only a small portion of the accumulated slag is discharged leaving a relatively deep solid bed above each valve. This minimizes the passage of water through the valve with the granulated slag material.

The discharge from one or more of valves 398a –398h may be collected, if desired, and combined to form a single particle-size classification. Thus, as illustrated in FIG. 7, classifying bin 400 is provided with only three discharge spouts 414, 416, and 148, feeding coarse, medium, and fine stockpiles 304, 306, and 308, respectively. Of course, it will be appreciated that any number of stockpiles may be utilized; a separate discharge bin may be provided for each of valves 398a–398h if desired.

The partially clarified water is discharged by overflowing the top of settling tank 396 into a peripheral gutter 420, which in turn empties into a discharge pipe 422. Preferably, first and second filtration apparatus such as 256 and 258, described above in connection with FIG. 5, are utilized in order to provide effective filtration of the water prior to its discharge into nearby rivers and streams.

Thus, there has been described above, an improved system using the steel slag granulation apparatus of my parent applications in conjunction with additional equipment for effective transportation of the granulated slag as a water-slag slurry, and for water extraction and filtration. It should be understood, however, that numerous variations of the above described system will be apparent to one skilled in the art in light of the disclosure.

For example, structural modifications or modifications of the arrangements specifically described may be made without departure from the basic concepts taught herein. Again, it will be appreciated that specifically described commercially available apparatus may be modified or replaced by functionally equivalent apparatus without departure from the scope of the invention.

Thus, the invention may be embodied in other specific forms without departing from the spirit or essential characteristics thereof. The present embodiment is therefore considered in all respects illustrative, and not restrictive, the scope of the invention being indicated by the appended claims rather than by the foregoing description and all changes which come within the meaning and range of equivalency of the claims are therefore intended to be embraced therein.

What is claimed is:

1. An apparatus for handling and treating molten slag comprising: a slag granulator including a receptacle; means for feeding molten slag into the receptacle; nozzle means for injecting one or more jetstreams of water into the receptacle to intercept the molten slag and to granulate said slag into particles; means for maintaining water accumulating in the receptacle at a level below the jetstreams while said molten slag intercepts the jetstreams above the level of the water accumulated in the receptacle; hydraulic transport means for transporting the granulated slag from the granulator in the form of a water-slag slurry; dewatering means for separating granulated slag from the water in said slurry; and filter means coupled to said dewatering means for receiving the residual slurry to reduce the solids content thereof to below a predetermined level.

2. Slag handling apparatus as defined in claim 1 further comprising: means for collecting steam produced by contact of the slag with water in said granulator, without substantial emission thereof from the granulator; means for transporting the collected steam from the granulator; and means for venting said steam to atmosphere at an appropriate discharge location.

3. Slag handling apparatus as defined in claim 1 wherein said nozzle means comprises at least one generally horizontally disposed nozzle with an aperture of relatively small vertical dimensions and substantially greater horizontal dimension; and means connecting said nozzle means to a supply of water including means for preventing particles larger than said smaller vertical nozzle dimension from reaching said nozzle.

4. Slag handling apparatus as defined in claim 1 wherein said nozzle means comprises a first section for injecting at least one generally horizontal water jetstream component into said granulator receptacle, second and third sections for injecting second and third generally vertical jetstream components into said granulator receptacle, said first, second, and third nozzle components being so positioned relative to each other that the composite jetstream is of generally U-shaped configuration.

5. Slag handling apparatus as defined in claim 1 further comprising means for pouring molten slag into the granulator at a predetermined rate.

6. Slag handling apparatus as defined in claim 1 wherein said means for feeding molten slag into the granulator comprises: means for transporting molten slag from a metal refining furnace; intermediate vessel means for receiving said molten slag and discharging the slag to said granulator receptacle at a rate within predetermined limits.

7. Slag handling apparatus as defined in claim 6 wherein; said transport means includes a slag pot and means for tilting said pot to pour molten slag into said intermediate vessel; and

24. Slag handling apparatus as defined in claim 23 wherein said transferring means includes an auxiliary vessel for receiving slag poured from said container, aperture means in the wall of said vessel, and overflow means in the wall of said vessel at a predetermined level above said aperture to limit the maximum head of molten slag above said aperture.

25. Slag handling apparatus as defined in claim 22 further including means for conveying said slag container from a furnace location to the granulator and means for emptying said container at a controlled rate.

26. Slag handling apparatus as defined in claim 22 wherein said means for removing said slag from said granulator and transporting it away from said granulator comprises hydraulic transfer means including conduit means, and pump means connected to said conduit means for propelling said slag through said conduit in the form of a granulated slag/water slurry.

27. Apparatus as defined in claim 26 wherein said slag-slurry transfer means includes an auxiliary tank for receiving granulated slag from said granulator receptacle, and means connecting said pump means to said auxiliary tank for removal of said slag from said tank and transportation through said conduit means.

* * * * *